Dec. 12, 1933.   O. G. GOLDMAN   1,938,958
FLUID PRESSURE CONTROLLING APPARATUS
Filed March 18, 1931   2 Sheets-Sheet 2
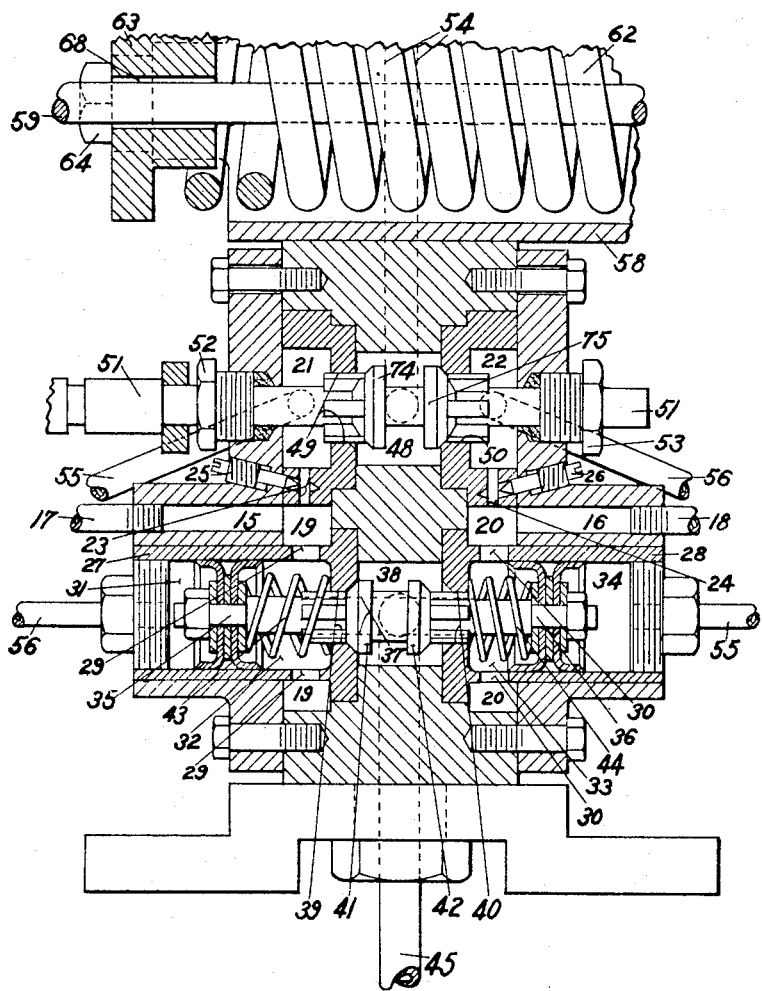
INVENTOR.
OSCAR G. GOLDMAN
BY
Miller Boykin & Bried
ATTORNEYS.

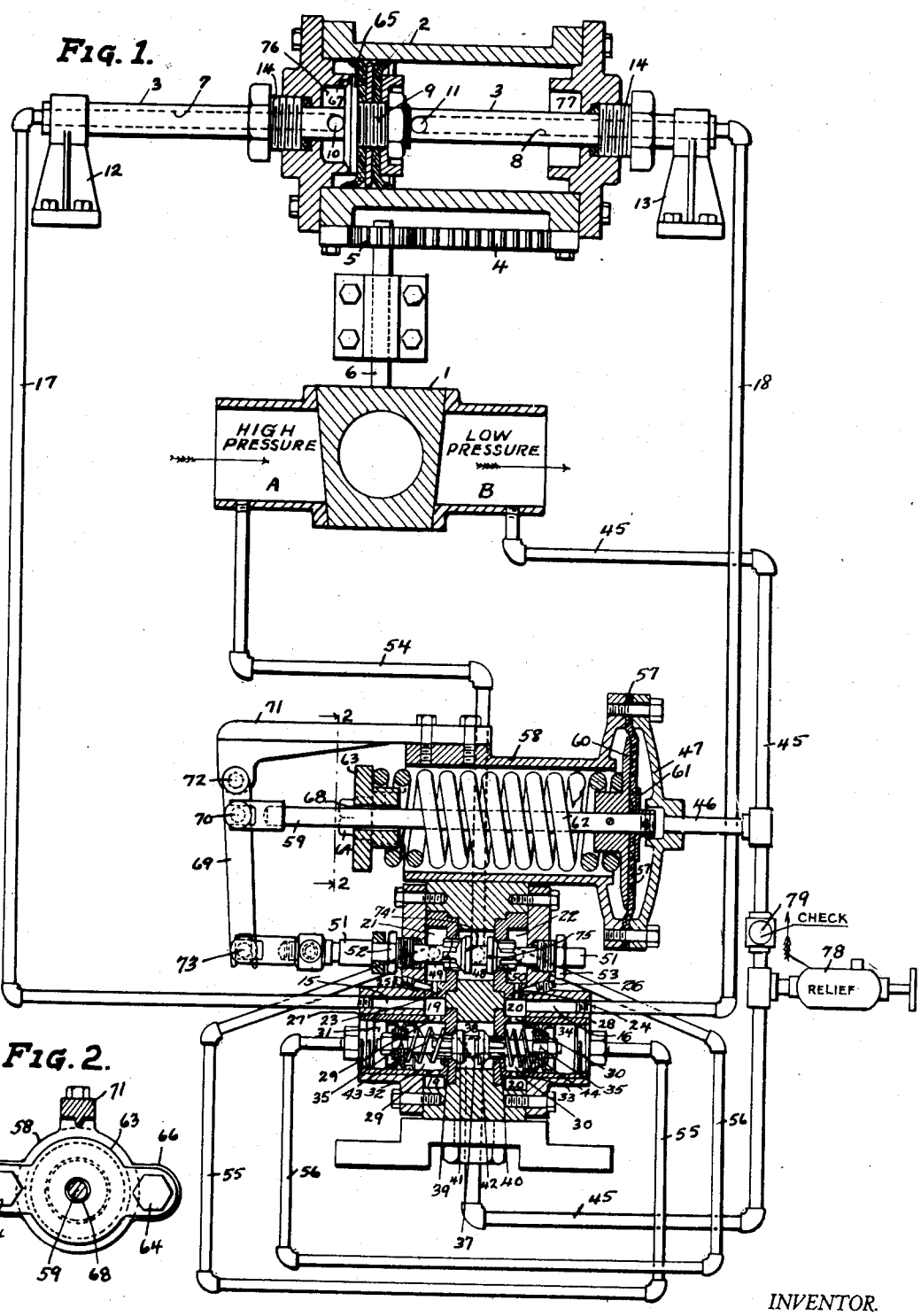

Patented Dec. 12, 1933

1,938,958

UNITED STATES PATENT OFFICE 1,938,958

FLUID PRESSURE CONTROLLING APPARATUS

Oscar G. Goldman, San Francisco, Calif.

Application March 18, 1931. Serial No. 523,485

14 Claims. (Cl. 50—11)

This invention relates to apparatus for automatically controlling the pressure of a fluid in a pipe line, such as city water mains subject to fluctuating demands. The principal object of the invention is to provide improved apparatus which will automatically control the opening and closing of a large valve in such a water main so that a predetermined pressure on the low pressure side of the valve will at all times be maintained. Another object is to provide such apparatus which will be particularly applicable to operate large plug valves.

Another object is the provision of means whereby the apparatus will automatically recover from a balanced condition of the fluid on opposite sides of the main valve.

Another object is to provide means whereby hunting action of such apparatus is eliminated. Still other objects lie in the detailed construction whereby the apparatus to carry out the main objects is accessible in its parts, and reliable in its operation. Further objects and features of the invention will appear in the following description and accompanying drawings.

In the drawings Fig. 1 is a cross section showing the internal construction of all the important elements of the apparatus.

Fig. 2 is an enlarged end view of the pressure spring adjusting nut or cap, as seen from the line 2—2 of Fig. 1.

Fig. 3 is an enlarged view of the lower central portion of Fig. 1.

Before describing the apparatus in detail it may be said to represent improvements over similar apparatus shown and described in my copending application filed under Serial No. 216,079 on August 29, 1927, which issued as Patent 1,803,697 on May 5, 1931, entitled "Pressure regulating valve", the present apparatus functioning in some respects in a manner not possible with the earlier construction.

The grouping of operative elements may take a variety of forms, such for instance as in the copending case where all elements are mounted on the main valve body, but in the drawings the elements have been arranged in a manner to best illustrate their operation without regard to compactness of assembly, and also without regard to relative proportions, as the main valve particularly would be very large, but as the constructional details of the main valve are not involved in this case the valve is drawn relatively small, though necessarily included as it forms part of the coordinated apparatus or system on which protection is sought.

In further detail the drawings show a main valve 1 of the plug type positioned in a water main having its inlet or high pressure side at A and its low pressure side at B, the plug being closed off and all the controlling apparatus in a position ready to respond and open the valve to a predetermined low pressure for which the apparatus may be set.

The control or turning movement of the main line valve 1 is accomplished by means of the sliding of a cylinder 2 along a stationary piston rod 3, the motion of the cylinder 2 being transferred to the valve 1 by means of a rack 4 carried by the cylinder and meshing pinion 5 secured to stem 6 of the valve.

The stationary piston rod 3 has two non-communicating passages 7 and 8 on either side of the piston 9, said piston 9 forming two chambers 76 and 77 inside of cylinder 2 respectively communicating with said passages 7 and 8 by means of outlets 10 and 11. Packing glands 14 at the ends of the cylinder prevent leakage at these points.

The piston rod is held stationary by means of the supports 12 and 13. The above elements form the reciprocable power device.

The passages 7 and 8 of the stationary stem 3 are connected to passages 15 and 16 of what may be termed the motivating apparatus by means of pipes 17 and 18. Passages 15 and 16 lead respectively to chambers 19 and 20, said chambers 19 and 20 being connected to chambers 21 and 22 by means of small passages 23 and 24. The openings of passages 23 and 24 are controlled by means of needle valves 25 and 26. Chambers 19 and 20 also communicate respectively with the inside of cylinders 27 and 28 by means of passages 29 and 30.

Cylinders 27 and 28 are divided into two chambers each 31, 32 and 33, 34 respectively, by means of pistons 35 and 36 said pistons being mounted on a common rod 37 and fitted with double cup leathers as indicated. Chambers 32 and 33 are connected to a central chamber 38 through openings 39 and 40, and through which the rod 37 passes. Secured to the rod are two valve discs 41 and 42 which respectively seal openings 39 and 40 as required. A compression spring 43 is placed around the shaft 37 between piston 35 and the end wall of cylinder 27 and compression spring 44 is also placed around shaft 37 between piston 36 and the end wall of cylinder 28, so as to tend to hold the valves 41, 42 centralized with openings 39 and 40 open.

Chamber 38 is open to the low pressure side of the main valve 1 at B by means of pipe 45. From pipe 45 a lead 46 is taken to diaphragm hood 47 which holds diaphragm 57 in place against compression spring 62 in cylinder 58. Between chamber 38 and the connection for pipe 46 is inserted in pipe 45 a spring controlled relief valve 78. Between relief valve 78 and the connection for pipe 46 is a check valve 79 so set as to permit the flow to be from chamber 38 to low pressure connection at B but not in reverse direction.

Chambers 21 and 22 connect to chamber 48 by means of openings 49 and 50. A piston rod 51 passes through chambers 21, 22 and 48 as well as through openings 49 and 50, said piston rod 51 being sealed by means of packing glands 52 and 53. Chamber 48 connects to the high pressure side of the main valve 1 at A by means of pipe 54. Secured upon piston rod 51 are valve discs 74 and 75 which seal openings 49 and 50 at opposite ends of the stroke of the rod.

Chamber 21 is connected to chamber 34 of cylinder 28 by means of pipe 55, while chamber 22 is connected to chamber 31 of cylinder 27 by means of pipe 56.

Rod 59 is held central and clamped to diaphragm 57 by means of flange plates 60 and 61, and against plate 60 is placed a compression spring 62 the compression on spring 60 being adjusted by means of a movable head 63 on cylinder 58. The head 63 is held in adjusted position by means of stud bolts 64 operating in lugs 66 on cylinder 58 (see Fig. 2). The head 63 has an opening 68 through the center for the free passage of rod 59.

Rod 59 is pivoted to a movable arm 69 by means of pin 70. Movable arm 69 is pivoted at 72 to a bracket 71 carried by the cylinder. The travel of rod 59 upon flexure of the diaphragm is transmitted to piston rod 51 through the movable arm 69 by means of pin 73, the movable arm 69 being slotted for pin 73 as indicated so as to permit the piston rod 51 to travel in a straight line.

Operation

When placing the pressure controlling apparatus into operation, it is first necessary to set the compression on spring 62 to the desired value by means of the stud bolts 64 working against the spring head 63. The total load thus placed on the compression spring 62 is transmitted to diaphragm 57 by means of plate 60.

The low pressure from the discharge side of the valve 1 at B is transmitted to the opposite side of the diaphragm 57 from that of the compression spring by means of pipe 45 and branch 46 and confined by means of diaphragm head 47.

When the total load on each side of the diaphragm 57 due to the compression spring and to that from the low pressure side of the main valve at B are equal, the position of diaphragm 57 will remain stationary. But as the pressure from the low pressure side of the valve at B increases over that of the spring, the diaphragm will move in such a direction as to decrease the length of said spring, whereas when the pressure from B falls below that produced by the spring the diaphragm will move in such a direction as to increase the length of the said spring.

This movement of the diaphragm is transmitted by rod 59 and arm 69 to piston rod 51 to open or close passages 49 and 50 as the case may be.

Chamber 48 is open to the high pressure side of valve 1 at A through pipe 54. Thus fluid at high pressure from A by way of chamber 48 enters either chamber 21 and is sealed from 22, or enters chamber 22 and is sealed from 21.

The high pressure on entering chamber 21 is then transmitted in two directions as follows: first, to chamber 34 of cylinder 28 by means of pipe 55; second, with chamber 19 by means of small passage 23. Passage 23 is of smaller area than pipe 55, its opening being controlled by means of the needle valve 25 and therefore the high pressure will build up faster in chamber 34 than in chamber 19.

It must be kept in mind that during the time of travel of piston rod 51 from one extreme position to the other, a period of time has elapsed during which the high pressure has been permitted to enter both chambers 21 and 22 thus producing a balanced pressure in all chambers and passages in the motivating apparatus and in the operating cylinder 2. This permits piston rod 37, due to the compression springs 43 and 44, to seek a neutral position thus opening chamber 38 to chambers 32 and 33 which in turn are respectively in communication with chambers 21 and 22 by way of passages 23 and 24, chambers 19 and 20 and passages 29 and 30. The pressures in chambers 34 and 31 are also at the same time equalized, being in communication with chambers 21 and 22 through pipes 55 and 56 respectively. It must be also kept in mind that the effective pressure areas of pistons 35 and 36 are greater in chambers 31 and 34 than in chambers 32 and 33 due to the area of the piston rod 37 on the inner ends of these pistons only.

The high pressure having entered chamber 34 causes piston rod 37 to move in such a direction so as to seal chamber 32 from chamber 38 by closing opening 39 by valve disc 41, at the same time opening chamber 33 to chamber 38 through passage 40.

The high pressure in chamber 21 now enters chamber 19 and chamber 32 through passages 23 and 29 and assists in sealing opening 39 by exerting a pressure against piston 35 which is in the same direction as that exerted in chamber 34 against piston 36. From chamber 19 the high pressure is transmitted to chamber 76 of operating cylinder 2 through passage 15, pipe 17, passage 7 and outlet 10.

It will be noticed that at the same time that the above has taken place in regard to the high pressure, chamber 77 of operating cylinder is in communication with the low pressure side of valve 1 at B through outlet 11 as follows: outlet 11 is connected to chamber 20 by means of passage 8, pipe 18 and passage 16; chamber 20 is connected to chamber 38 by passage 30, chamber 33 and opening 40, chamber 38 being connected to B by means of pipe 45, passing by relief valve 78 and through check valve 79.

Due to the unbalanced condition in chambers 76 and 77 of cylinder 2, since chamber 76 now contains high pressure while chamber 77 contains low pressure, cylinder 2 will slide along the stationary rod 3 toward the fixed support 12 thereby causing valve 1 to open by means of the rack and pinion connections described, thereby increasing the supply from the high pressure to the low pressure side of the main valve 1.

This opening of main valve will continue by means of the movement of cylinder 2 until the low pressure as supplied to the diaphragm 57 through pipes 45, 46, produces a load slightly greater than that produced by the compression spring 62 against the diaphragm 57. When this point of loading against the diaphragm 57 has been reached a slight movement of the diaphragm 57 will take place, which in turn will be transmitted to piston rod 51 by rod 59 and arm 69. This movement of piston rod 51 will cause chamber 48 which contains high pressure to be put in communication with chambers 21 and 22 by removing valve disc 75 from opening 50 but at the same time not sealing opening 49 with valve 74.

The opening of chambers 21 and 22 to chamber 48 simultaneously, neutralizes the pressures in chambers 76 and 77 of cylinder 2 thereby causing all movements to cease, as explained above.

Should the low pressure increase above the predetermined value, thereby producing a load on the diaphragm 57 greater than that produced by the compression spring 62, thus causing piston rod 51 to travel to the opposite position from that shown in Fig. 1, the high pressure from A would then be transmitted to chamber 77 of cylinder 2, while chamber 76 of cylinder 2 would be connected to the low pressure at B, similar to that described above.

The entering of high pressure in chamber 77 and low pressure in chamber 76 would cause cylinder 2 to slide on the fixed piston rod 3 toward the fixed support 13, thereby turning main valve 1 toward closing position. This movement of valve 1 would continue until a neutral position of piston rod 51 is again established due to a balancing of the loads on both sides of the diaphragm 57, when valve 1 would become stationary.

Thus it is seen that by this apparatus the main valve 1 is automatically operated so as to maintain a predetermined low pressure at B and is independent of the high pressure at A, the high pressure being used only for the power required for the opening or closing of the main valve. It will also be seen that there is no waste of the fluid from the main pipe line since the discharge from chambers 76 and 77 of cylinder 2 is returned to the low pressure side of the valve 1 at B and it is only the difference of pressure between these points which is utilized to operate the power cylinder 2.

There is one extreme condition that has not been described, and is as follows: It is possible that the draft or demand from the low pressure side of the main valve may be so great as to cause the main valve to completely open, which might then result in equal pressures at A and B. The equalization of pressures at A and B would remove the power necessary to close the main valve when the draft on the main pipe line decreased or ceased, and would therefore result in the low pressure increasing above the predetermined value for which the apparatus was set.

In order to overcome this possibility, relief valve 78 and check valve 79 are inserted in the pipe 45. The relief valve is set to discharge into atmosphere at a slightly higher pressure than the predetermined low pressure. The check valve is set so as to only permit flow from chamber 38 toward B, or in other words, to close when the flow attempts to travel from B towards chamber 38. The location of the relief valve and check valve must be in pipe 45 between chamber 38 and pipe 46, the relief valve being closer to chamber 38 than the check valve.

The effect of inserting relief valve 78 and check valve 79 as described, is as follows, it being assumed the main valve 1 is open and the pressures at A and B are equal. Assume now that the demand on the discharge side of the main line valve has decreased to such an amount that the pressure at B rises just above the predetermined value for which spring 62 is set but still lies below that at which the relief valve 78 is set.

The pressure at B being above the predetermined value as set by the compression spring 62 causes piston rod 51 to close chamber 21 from chamber 48 and open chamber 22 to chamber 48. (The opposite of what is shown in the drawings.) But since the pressures at A and B are still equal the pressures in chambers 76 and 77 of cylinder 2 are equal and no movement of cylinder 2 takes place.

Assume that the demand on the discharge side of the main line valve 1 continues to decrease until the pressure at A and B increases above that for which the relief valve 79 is set and it therefore begins to discharge into atmosphere. This discharging of the relief valve 78 is now due to the pressure at A since the check valve 79 closes when the pressure at B is above that at which the relief valve 78 discharges. The discharging of the relief valve maintains the pressure in chamber 76 of cylinder 2 at the same value at which the relief valve is set, while the position of piston rod 51 allows the pressure at A to enter chamber 77 of cylinder 2 (the cylinder at this time being to the left or other end of the stroke shown in Fig. 1 and with the main valve 1 fully open). As the pressure at A increases the differential in pressure in chambers 76 and 77 of cylinder 2 increases, until sufficient power becomes available to cause the cylinder 2 to slide toward support 13 thereby closing somewhat the main line valve 1 thus causing the low pressure to drop until the predetermined value is reached when piston rod 51 again moves to a neutral position and all movements stop, the mechanism again returning to normal operation.

A feature of importance which should be mentioned is that when the main line valve 1 is shut off as in Fig. 1 and assuming the valve to be installed in a system such as a fire sprinkler system where a fixed pressure of say 100 lbs. would be maintained on the low pressure side of the main valve, there being ordinarily no demand or draft the main valve would remain closed indefinitely when such a pressure was built up, and of course the power cylinder 2 would be over to the right as shown in the drawings with the high pressure, say perhaps 300 lbs. in chamber 77. Therefore, to prevent a possible leakage of the pressure past the double cup leathers of piston 9 shown on the drawings, I provide a round tapered valve disk 65 closing against a complementary valve seat 67 thus effectually sealing against any possible building up of a pressure in chamber 76.

Attention is also called to the fact that when a state of balance on both sides of diaphragm 57 is reached at any setting of the spring, valves 74 and 75 as well as valves 41 and 42 are all open so as to balance the pressure throughout the parts, and that therefore the apparatus does not come to a state of rest because of shutting off a valve, but because of opening all valves to neutralize the forces. Also to be observed is the fact that valves 41, 42 control the discharge to pipe 45 from opposite ends respectively of power cylinder 2 while sealing the power end of the cylinder to hold the pressure being introduced from either chamber 19 or 20 as the case may be, and that the pistons 35, 36 being small and supplied with pressure fluid by pipes 55, 56 by-passing around restricted passages 23, 24 move first before cylinder 2 will start.

Another point of importance is the restricted passages at 23, 24 which give a slow steady movement to cylinder 2 so that there is no rebound or surging effects, also that the needle valves 25, 26 provide for independent control of the speed of travel for either closing or opening movement of the main line valve 1 so that it may be made to open slowly and close quickly or vice versa if desired.

Having thus described my improved fluid pressure controlling apparatus it will be evident that variations in the detailed mechanical structure may be made within the spirit of the invention and scope of the appended claims.

I claim:—

1. Fluid pressure regulating apparatus comprising a main line valve, a reciprocable fluid-operated power device arranged for operating said main line valve for opening and closing the same, means for admitting fluid from the high pressure side of said main line valve to either end of said reciprocable power device for a power stroke, means for discharging the fluid from either side of said device upon return stroke into the low pressure side of said line, mechanism adjustably responsive to pressure from the low pressure side of said main line valve arranged to control said means, and means to cause a differential in fluid pressure operative on one end of said power device for turning the valve toward closing when the pressure on both sides of the open valve are substantially even.

2. Fluid pressure regulating apparatus comprising a main line valve, a reciprocable fluid-operated power device arranged for operating said main line valve for opening and closing the same, means for admitting fluid from the high pressure side of said main line valve to either end of said reciprocable power device for a power stroke, means for discharging the fluid from either side of said device upon return stroke into the low pressure side of said line, mechanism adjustably responsive to pressure from the low pressure side of said main line valve arranged to control said means, and means to cause a differential in fluid pressure operative on one end of said power device for turning the valve toward closing when the pressure on both sides of the open valve are substantially even comprising a relief valve on the discharge from one end of said power device.

3. Fluid pressure regulating apparatus comprising a main line valve, a reciprocable fluid-operated power device arranged for operating said main line valve, motivating apparatus controlling the admission and discharge of operating fluid from said power device, and a fluid pressure responsive device open to pressure from the low pressure side of said main line valve controlling the operation of said motivating apparatus, said motivating apparatus including fluid passages extending to opposite ends of said power device, passages from both high and low pressure sides of said main line valve, and separate valves controlling said passages whereby the high pressure side of the line is connected with either end of said power device for admission of fluid thereto while shutting off the high pressure from the opposite end of said power device, and the low pressure side is connected to the opposite end of the device for discharge of fluid therefrom.

4. In a structure as specified in claim 3, the valve controlling the admission of fluid being mechanically operated by said pressure responsive device, and the valve controlling the discharge is operated by fluid pressure controlled by the mechanically operated valve.

5. In a structure as specified in claim 3, said pressure responsive device receiving its controlling pressure from the discharge passage to the low pressure side of the main line valve.

6. In a structure as specified in claim 3, said pressure responsive device receiving its controlling pressure from the discharge passage to the low pressure side of the main line valve, a check valve on the discharge passage at a point between said pressure responsive device and said motivating apparatus, and a relief valve on the discharge passage at a point between said check valve and said motivating apparatus.

7. In an automatic fluid pressure regulating valve motivating apparatus including a plurality of fluid passages, a fluid pressure responsive device controlling said motivating apparatus, a controlling valve connected for operation to said fluid responsive device controlling a plurality of said passages and a piston valve controlling a further plurality of said passages operated by fluid pressure from passages controlled by said controlling valve.

8. In an automatic fluid pressure regulating valve, motivating apparatus including a plurality of fluid passages, a fluid pressure responsive device controlling said motivating apparatus, a controlling valve connected for operation to said fluid responsive device controlling a plurality of said passages, and a piston valve controlling a further plurality of said passages operated by fluid pressure delivered to opposite ends respectively from passages controlled by said controlling valve.

9. In an automatic fluid pressure regulating valve, motivating apparatus including a plurality of fluid passages, a fluid pressure responsive device controlling said motivating apparatus, a controlling valve connected for operation to said fluid responsive device controlling a plurality of said passages, a piston valve controlling a further plurality of said passages operated by fluid pressure delivered to opposite ends respectively from passages controlled by said controlling valve, and spring means tending to hold said piston valve in intermediate position with passages open when not under fluid pressure from said controlling valve.

10. Fluid pressure regulating apparatus comprising a main line valve, a reciprocable fluid-operated power device arranged for operating said main line valve for opening and closing the same, means for admitting fluid from the high pressure side of said main line valve to either end of said reciprocable power device for a power stroke, means for discharging the fluid from either side of said device upon return stroke into the low pressure side of said line, mechanism adjustably responsive to pressure from the low pressure side of said main line valve arranged to control said means, and means whereby when the pressure responsive mechanism is in state of balance all parts of the system will be in hydrostatic balance.

11. In an apparatus as specified in claim 3, means for changing the operating value of said fluid pressure responsive device, and the arrangement of the valves controlling said passages being such that when said fluid pressure responsive device is substantially in balance all the valves will be open.

12. In an apparatus as specified in claim 3, means for changing the operating value of said fluid pressure responsive device, and the arrangement of the valves controlling said passages being such that when said fluid pressure responsive device is substantially in balance a condition of hydrostatic balance will obtain at all operative points in the apparatus open to fluid pressure.

13. In a construction as specified in claim 3, means whereby in operation of the apparatus the valve controlling the discharge from said power device will be opened substantially before admission of fluid under pressure to the power side of said device.

14. Fluid pressure regulating apparatus comprising a main line valve, a reciprocable fluid-operated power device arranged for operating said main line valve for opening and closing the same, means for admitting fluid from the high pressure side of said main line valve to either end of said reciprocable power device for a power stroke, means for discharging the fluid from either side of said device upon return stroke into the low pressure side of said line, mechanism adjustably responsive to pressure from the low pressure side of said main line valve arranged to control said means, and a positively seating valve in said reciprocable fluid-operated power device arranged to close upon its seat when the main line valve is shut off to prevent leakage of pressure from one end of the power device to the other.

OSCAR G. GOLDMAN.